United States Patent
Radosta et al.

(10) Patent No.: US 10,040,613 B2
(45) Date of Patent: Aug. 7, 2018

(54) LINERS FOR COOKING VESSELS

(71) Applicant: M & Q IP Leasing, LLC, Limerick, PA (US)

(72) Inventors: Joseph A. Radosta, Easton, PA (US); Michael D. Schmal, Orwigsburg, PA (US); Connie M. Jacobe, Sellersville, PA (US)

(73) Assignee: M & Q IP Leasing, LLC, Limerick, PA (US)

( * ) Notice: Subject to any disclaimer, the term of this patent is extended or adjusted under 35 U.S.C. 154(b) by 571 days.

(21) Appl. No.: 14/645,074

(22) Filed: Mar. 11, 2015

(65) Prior Publication Data
US 2016/0264329 A1    Sep. 15, 2016

(51) Int. Cl.
*A47J 36/06*    (2006.01)
*B65D 65/12*    (2006.01)
(Continued)

(52) U.S. Cl.
CPC .............. *B65D 65/12* (2013.01); *B31B 70/00* (2017.08); *B31B 70/266* (2017.08); *B31B 70/64* (2017.08); *B65D 25/16* (2013.01); *B65D 65/40* (2013.01); *B65D 81/3897* (2013.01); *A47J 36/00* (2013.01); *B31B 2150/00* (2017.08); *B31B 2160/00* (2017.08); *B31B 2160/102* (2017.08);
(Continued)

(58) Field of Classification Search
CPC ........... A47G 23/08; A47J 36/06; A47F 10/06
USPC ..................... 220/287, 23.86, 573.1; 383/120
See application file for complete search history.

(56) References Cited

U.S. PATENT DOCUMENTS

| 3,382,136 A | 5/1968 | Bugel et al. |
| 3,892,058 A * | 7/1975 | Komatsu ................... A23L 3/00 422/40 |

(Continued)

FOREIGN PATENT DOCUMENTS

| CN | 2597196 | 1/2004 |
| CN | 203410125 | 1/2014 |

(Continued)

OTHER PUBLICATIONS

Staugaitis, C. L., and L. Kobren, "Mechanical and Physical Properties of the Echo II Metal-polymer Laminate", NASA Technical Note, NASA TN D-3409, National Aeronautics and Space Administration, Washington, D.C. (1966).
(Continued)

*Primary Examiner* — King M Chu
(74) *Attorney, Agent, or Firm* — Sterne, Kessler, Goldstein & Fox P.L.L.C.

(57) ABSTRACT

Liners for cooking vessels, cooking systems, and methods of making liners for cooking vessels are disclosed. The liner can be a multi-layer liner having a bag-like structure with a closed bottom having a bottom edge, a top opening having first and second top edges, and two sealed sides. The liner can have a first side seal extending along a first end from the top opening toward the bottom edge and a second side seal extending along a second end from the top opening toward the bottom edge. The liner material can include an aluminum foil sheet thermally laminated to a polymer film. The polymer film can include a biaxially-oriented polyethylene terephthalate layer coextruded with an amorphous polyethylene terephthalate sealant layer.

24 Claims, 17 Drawing Sheets

(51) Int. Cl.
  *B65D 65/40* (2006.01)
  *B65D 25/16* (2006.01)
  *B65D 81/38* (2006.01)
  *B31B 70/00* (2017.01)
  *B31B 70/64* (2017.01)
  *B31B 70/26* (2017.01)
  *A47J 36/00* (2006.01)
  *B31B 150/00* (2017.01)
  *B31B 160/20* (2017.01)
  *B31B 160/00* (2017.01)
  *B31B 170/20* (2017.01)
  *B31B 160/10* (2017.01)

(52) U.S. Cl.
  CPC ....... *B31B 2160/20* (2017.08); *B31B 2170/20* (2017.08)

(56) References Cited

U.S. PATENT DOCUMENTS

| | | | |
|---|---|---|---|
| 4,087,300 A | 5/1978 | Adler | |
| 4,769,261 A | 9/1988 | Hazelton et al. | |
| 4,942,095 A | 7/1990 | Buchert et al. | |
| 5,158,831 A | 10/1992 | Schirmer | |
| 6,082,566 A | 7/2000 | Yousif et al. | |
| 6,908,684 B2 | 6/2005 | Angelopoulos et al. | |
| 7,112,764 B2 | 9/2006 | Garcia | |
| 7,163,120 B1 * | 1/2007 | Blucher | A47J 36/16 220/573.4 |
| 7,211,035 B2 | 5/2007 | Ichikawa et al. | |
| 7,422,782 B2 | 9/2008 | Haedt et al. | |
| 8,048,532 B2 | 11/2011 | Urbain et al. | |
| 8,231,949 B2 | 7/2012 | Frank | |
| 8,950,622 B1 | 2/2015 | Blucher et al. | |
| 2005/0013951 A1 | 1/2005 | Mitchell et al. | |
| 2008/0245466 A1 | 10/2008 | Schmal et al. | |
| 2012/0225227 A1 | 9/2012 | Radosta et al. | |
| 2013/0047974 A1 * | 2/2013 | Payen | B65D 75/5805 126/263.07 |
| 2014/0084011 A1 | 3/2014 | Sanders | |
| 2014/0234493 A1 | 8/2014 | Forloni | |
| 2015/0056354 A1 | 2/2015 | Blucher et al. | |

FOREIGN PATENT DOCUMENTS

| | | |
|---|---|---|
| EP | 1995054 | 11/2008 |
| GB | 2501863 | 11/2013 |

OTHER PUBLICATIONS

English-language Abstract for CN 2597196 (FP1, published on Jan. 7, 2004).

English-language Abstract for EP 1995054 (FP2, published on Nov. 26, 2008).

English-language Abstract for CN 203410125 (FP4, published on Jan. 29, 2014).

International Preliminary Report on Patentability, and Written Opinion of the International Searching Authority for International Appl. No. PCT/US2016/022000, The International Bureau of WIPO, Geneva, Switzerland, dated Sep. 21, 2017, 11 pages.

\* cited by examiner

LINERS FOR COOKING VESSELS

BACKGROUND

Field

The present disclosure relates to liners for cooking vessels and cooking systems. More specifically, the present disclosure relates to thermally laminated multi-layer liners for cooking vessels and cooking systems.

Background

Current commercially available plastic liners for use with cooking vessels, for example, in electric roasters, are typically produced from durable high temperature nylon or polyester films. Examples of such films are described in U.S. Pat. No. 7,163,120 to Blucher, which is incorporated by reference herein in its entirety. These liners are suitable for continuous service conditions at temperature conditions ranging from −100° F. to about 400° F. The function of these pan liners is to form a barrier between the interior surface of the cooking vessel (e.g., a pan) and the food to be cooked or heated. A major benefit of these liners is eliminating the laborious soaking and scrubbing of the pan after the cooking process is completed. Further, the liners improve food safety and quality by keeping food separate from the surfaces of the cooking vessel, enhancing flavor and juiciness of foods, minimizing clean up time and resource consumption, and reducing food loss by allowing leftover food to be easily removed from the cooking vessel and saved for later use. The liners also prevent food from "baking-on" and "burning-on" to the cooking vessel's surfaces.

Although these liners have been successfully used in many conventional cooking applications (such as ovens, electric turkey roasters, slow cookers, steamers, crock pots, pressure cookers, etc.), they have been used with mixed results in certain applications such as with electric roasters. In electric roasters, the heating elements are typically located in the sidewalls of the unit. Recommended cooking procedure for meats is to preheat the electric roaster (with 1-2 cups of water in the bottom of the roaster pan) using a roaster temperature setting not to exceed 350° F. The reason for this procedure is to try to stabilize the wall temperatures and minimize temperature hotspots. Even using these recommended preheat procedures, hotspots still occur at varying locations and times in the walls of many electric roaster brands. In some roasters, roaster wall hotspots vastly exceed the melting point of the liner. For example, hotspots can reach as high as 570° F., but the melting point of commercially available nylon or polyester liners is about 490° F. to 495° F. This can result in the plastic liner melting and adhering to the electric roaster pan wall, damaging the roaster or requiring a difficult cleaning process and potentially contaminating the food.

There is a need, therefore, for an improved liner for cooking vessels. In particular, there is a need for a simple, flexible, replaceable, disposable, and durable liner having high temperature attributes that conforms to the shape, size, and contour of the cooking vessel.

The novel liners disclosed herein keep all the positive attributes of current nylon or polyester liners but also allow its use as an electric roaster liner by preventing the plastic liner from melting and adhering to the electric roaster pan wall during the cooking process.

BRIEF SUMMARY

The present disclosure is directed to liners for cooking vessels, cooking systems, and methods of making liners for cooking vessels. In certain embodiments, the liner can be a multi-layer liner having a bag-like structure. The liner can have a closed bottom with a bottom edge, a top opening with a first and second top edge, and two sealed sides. The liner can have a first side seal extending along a first end from the top opening toward the bottom edge and a second side seal extending along a second end from the top opening toward the bottom edge. In certain embodiments, the first and second side seals are substantially parallel with the first and second ends, respectively. A first lateral wall can be formed by the first top edge, bottom edge, first side seal, and second side seal and a second lateral wall can be formed by the second top edge, bottom edge, first side seal, and second side seal. In certain embodiments, the liner material comprises an aluminum foil sheet and a polymer film. The polymer film can include a biaxially-oriented polyethylene terephthalate layer coextruded with an amorphous polyethylene terephthalate sealant layer. The aluminum foil sheet can be thermally laminated to the polymer film.

In certain embodiments, the amorphous polyethylene terephthalate sealant layer is disposed between the biaxially-oriented polyethylene terephthalate layer and the aluminum foil sheet. In certain embodiments, the amorphous polyethylene terephthalate sealant layer has a lower melting point than the biaxially-oriented polyethylene terephthalate layer. The polymer film can be disposed as an interior surface of the liner.

In certain embodiments, the liner further comprises a first angled seal extending from the first side seal toward the bottom edge and a second angled seal extending from the second side seal toward the bottom edge. In certain embodiments, the first side seal and first angled seal can form a first continuous seal, and the second side seal and second angled seal can form a second continuous seal. In certain embodiments, the first and second angled seals are each disposed at an angle between about 20 degrees and 70 degrees, and preferably in the range of about 45 degrees, with respect to the respective first or second side seal. In certain embodiments, the first and second angled seals can form dog ear portions of the liner. The dog ear portions can be removable.

In certain embodiments, the polymer film and aluminum foil sheet are thermally laminated at a temperature of about 280° F. In certain embodiments, the polymer film and aluminum foil sheet can be thermally laminated at a temperature greater than 280° F. Preferably, the aluminum foil sheet is thermally laminated to the polymer film without using an adhesive. It is also preferable that the liner is capable of withstanding a cooking temperature of at least about 400° F. for at least about two hours.

In certain embodiments, the aluminum foil sheet has a thickness in the range of about 0.2 mils to about 0.7 mils. In certain embodiments, the aluminum foil sheet has a thickness of about 0.35 mils. In certain embodiments, the polymer film has a thickness in the range of about 0.5 mils to about 1.5 mils. In certain embodiments, the polymer film has a thickness of about 1.2 mils.

The cooking vessel used with the liner can be an electric roaster. The liner can be sized to fit about an interior of the electric roaster. For example, for a 22-quart electric roaster and the liner can have a width and length of about 34 inches and about 16 inches, respectively. In certain embodiments, the aluminum foil extends only along a portion of the first and second lateral walls. This foil band can coincide with the inner wall(s) of an electric roaster. That is, the liner is primarily formed from the polymer film, except for a medial band of the aluminum foil heat laminated to the polymer film. This band of aluminum foil is positioned on the liner to correspond to the position of the heating elements commonly found in the lateral walls of an electric roaster, because it is at this portion of the electric roaster that hotspots are mostly likely to occur. The aluminum band, positioned to correspond to the likely position where a hotspot will occur, will protect the polymer film from the high temperatures that could cause melting.

Systems for cooking food are also disclosed. In certain embodiments, the system includes a cooking vessel and a liner or bag sized to fit about an interior surface of the cooking vessel. In certain embodiments, the cooking vessel can be an electric roaster, a baking dish, or a Gastronorm pan. The liner or bag can comprise an aluminum foil sheet thermally laminated to a polymer film according to one of the embodiments described herein.

Methods of making a cooking liner are also disclosed. In certain embodiments, the method includes forming a multi-layer sheet by thermally laminating an aluminum foil sheet to a polymer film. In certain embodiments, the polymer film can comprise a biaxially-oriented polyethylene terephthalate layer coextruded with an amorphous polyethylene terephthalate sealant layer. The method can further include folding the multi-layer sheet substantially in half such that the aluminum foil faces outward, the folded multi-layer sheet having a bottom edge, first and second free edges opposite the bottom edge, and first and second ends substantially perpendicular to the bottom edge and the free edges. The method can further include sealing the first and second ends between the free edges and bottom edge, forming an opening and an interior of the cooking liner. In one embodiment, the aluminum sheet is smaller in size than the polymer film so that, when the aluminum foil is laminated to the polymer film, the resulting liner will include only a band of aluminum foil at a medial portion of the liner.

In certain embodiments, thermally laminating the aluminum foil sheet to the polymer film comprises rolling the aluminum foil sheet and the polymer film between a pair of heat rollers heated to a temperature of at least about 280 degrees Fahrenheit. In certain embodiments, sealing the first and second ends comprises forming a seal having a longitudinal portion and an angled portion.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant arts to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
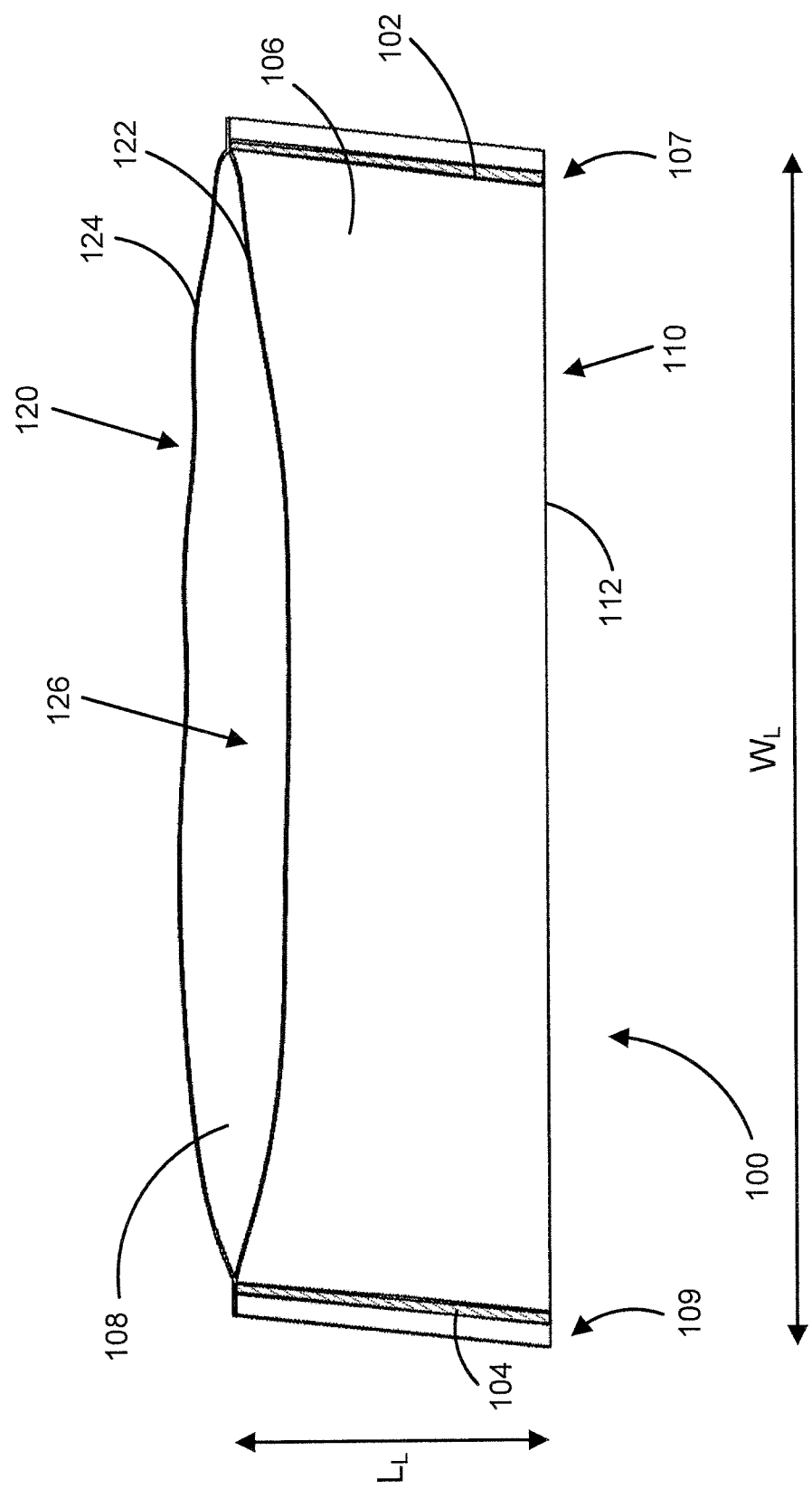
FIG. 1 illustrates a liner, according to an embodiment disclosed herein.

Embodiments of the present disclosure will now be described in detail with reference to embodiments thereof as illustrated in the accompanying drawings, in which like reference numerals are used to indicate identical or functionally similar elements. References to "one embodiment", "an embodiment", "some embodiments", "in certain embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The liners disclosed herein can be used for lining "cooking vessels," for example, but not limited to, electric roasters, roasting pans, slow-cookers, crock pots, pans, pots, trays, baking dishes, containers, kettles, bowls, etc., in a variety of shapes and sizes. While the embodiments disclosed herein find particular application and advantage when used with electric roasters, the liners and systems are not so limited. In certain embodiments, the liners can be used with Gastronorm pans (see, e.g., the European Committee for Standardization standard sizes for containers used in the catering industry as specified in the EN 631 standard). Table 1 shows examples of standard Gastronorm pan sizes used in commercial and industrial kitchens. Custom sizes of the liners can also be manufactured and used.

TABLE 1

Standard Size Pans.

| Pan Description | Pan Size (L × W) | Pan Depth (H) |
|---|---|---|
| Half Pan-Shallow | 12.8" × 10.4" | 2.5" |
| Half Pan-Medium & Deep | 12.8" × 10.4" | 4" & 6" |
| Third & Quarter Pan-Medium & Deep | 12.8" × 6.9" | 4" & 6" |
| Third & Quarter Pan-Shallow | 12.8" × 6.9" | 2.5" |
| Sixth Pan | 6.4" × 6.9" | 6" |
| Hotel Pan-Shallow & Medium | 12.8" × 20.8" | 2.5" & 6" |
| Hotel Pan-Deep | 12.8" × 20.8" | 6" |
| 2 Quart Round | | 8.2" |
| 4 Quart Round | | 8.2" |
| 6 & 7 Quart Round | | 8.2" |
| 9 & 11 Quart Round | | 8.2" |
| Bun Sheet Pan | 18.5" × 26.5" | n/a |
| G.I. Roasting Pan | 20" × 17" | 6.5" |
| Large Roasting Pan | 25.5" × 17.5" | 4" |

The liners can also be used on their own, separate from any sort of container. For example, the liners can be used in an oven or on a grill. In such embodiments, the liner can be used as a bag, where the food to be cooked is placed inside the liner/bag, which is then placed directly into the oven or on the grill. The liners can also be used in conjunction with other food cooking systems or as a containment system (e.g., product storage). It is also understood that the liners disclosed herein can also be utilized in non-cooking applications.

Many concepts were considered and tested before arriving at the novel liners disclosed herein. For example, vacuum metallized plastic films were tested with metallized aluminum portions having a thickness between about 150-450 Angstroms. The metallized layers were too thin to prevent the plastic liners from melting and adhering to the cooking vessel at the elevated temperatures (e.g., 570° F.) often seen in electric roasters. So a thicker layer of aluminum foil was adhesively laminated to biaxially-oriented polyester (polyethylene terephthalate) film ("BOPET"). In one embodiment, 70 gage aluminum foil was adhesively laminated to 120 gage BOPET film. Although this embodiment prevented the liner from melting to the cooking vessel, there are other associated problems. First, many high-temperature adhesives would not pass FDA certification for use in cooking applications. Second, the adhesive coating/lamination process requires an initial thermal cure with additional cure time for the adhesive to fully crosslink, which slows down production time and increases cost. In seeking to solve these problems, the disclosed liners were created.

Figure 12:
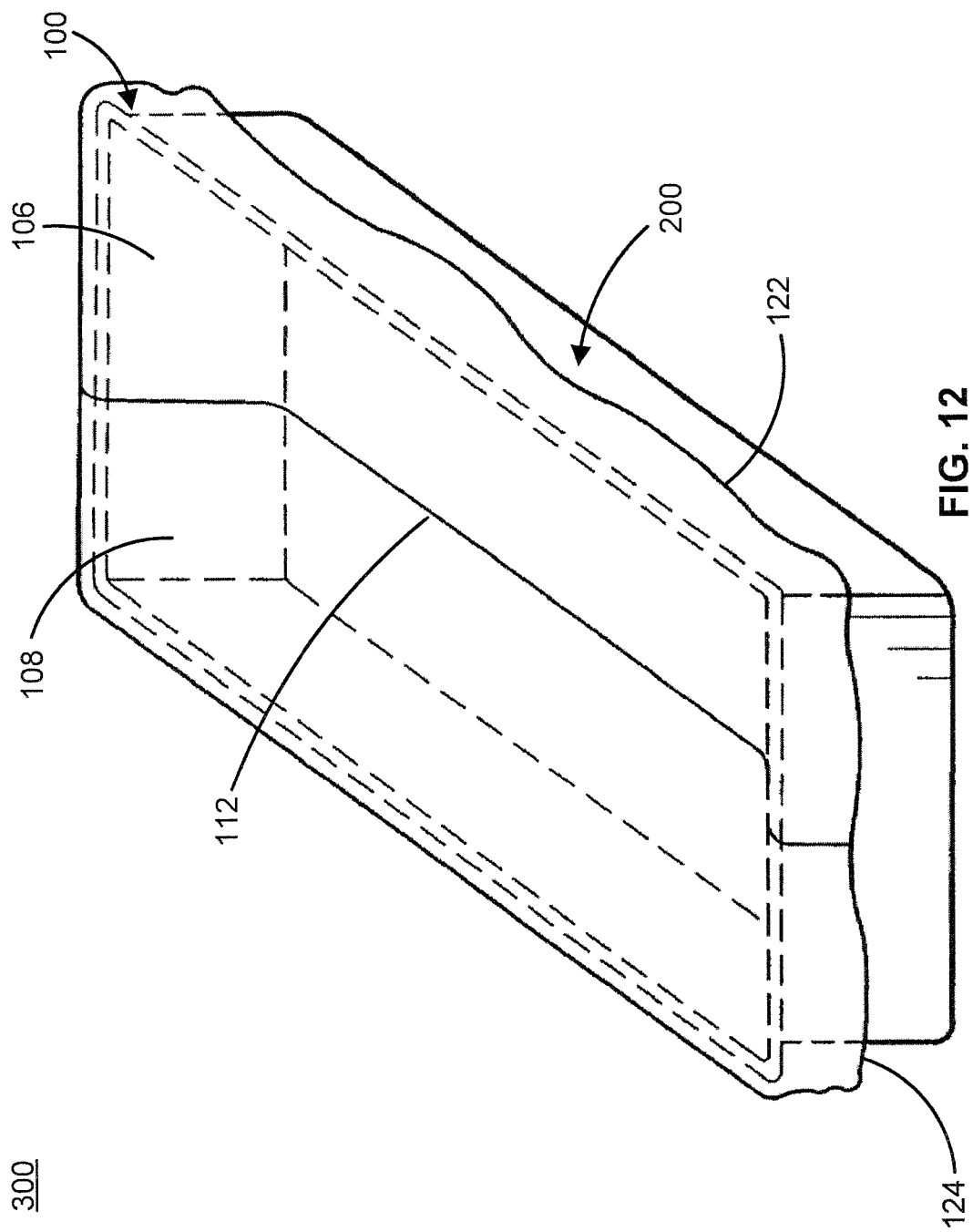
FIG. 12 illustrates a cooking system, according to an embodiment disclosed herein.

As described herein and shown, for example in FIG. 12, a liner 100 is generally constructed with dimensions suitable for a particular size or range of sizes of cooking vessels, for example, a pan 200. Although the generic term "pan" is generally used to describe the cooking vessels in the disclosed embodiments, it is understood that the embodiments can be any other cooking vessel, for example, the cooking vessels disclosed herein. In a preferred embodiment, the cooking vessel is an electric roaster of the type having heating elements on the sides of a centrally positioned pan or pot. Such electrical roasters are commercially available and are often referred to as turkey roasters. The pan or pot can be constructed, for example, from a glass, ceramic, or metal material.

Figure 11:
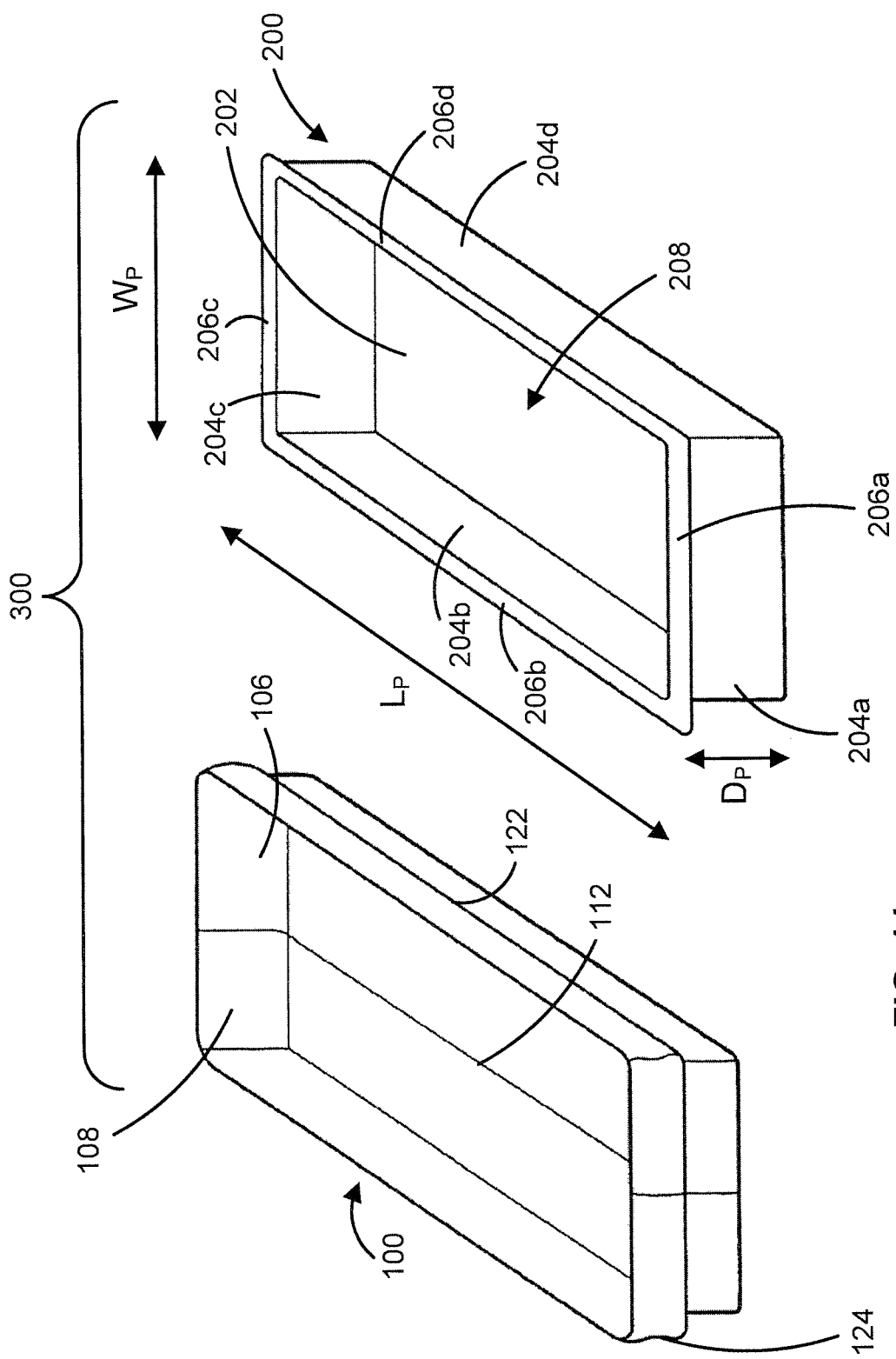
FIG. 11 illustrates a liner and cooking vessel of a cooking system, according to an embodiment disclosed herein.

FIG. 11 shows that pan 200 has a pan length ($L_P$), a pan width ($W_P$), and a pan depth ($D_P$). FIG. 1 shows that liner 100 has a liner length ($L_L$), a liner width ($W_L$). In an embodiment, the following guidelines may be used to select a liner size for use with a particular pan size. For example, for a particular pan, the liner width ($W_L$) should be at least slightly longer than the sum of the pan's length ($L_P$) and width ($W_P$). For example, the liner width ($W_L$) can be approximately one (1) inch greater than the sum of the pan's length ($L_P$) and width ($W_P$). This can allow the liner to fit well within the pan. Further, in certain embodiments, the liner length ($L_L$) can be one half the pan width plus one and half times the pan depth such that: $L_L = (0.5 \times W_P) + (1.5 \times D_P)$.

Table 2 shows certain non-limiting examples of liner dimensions for liners that can be used with the indicated cooking vessels.

TABLE 2

| Cooking Vessel | Cooking Vessel Dimensions $L_P \times W_P \times D_P$ | Liner Dimensions $W_L \times L_L$ |
|---|---|---|
| Third Pan-Shallow | 12.8" × 6.9" × 2.5" | 19" × 10" |
| Third Pan-Medium | 12.8" × 6.9" × 4" | 19" × 14" |
| Third Pan-Deep | 12.8" × 6.9" × 6" | 19" × 14" |
| Half Pan-Shallow | 12.8" × 10.4" × 2.5" | 23" × 11" |
| Half Pan-Medium | 12.8" × 10.4" × 4" | 23" × 14" |
| Half Pan-Deep | 12.8" × 10.4" × 6" | 23" × 14" |
| Hotel Pan-Shallow | 20.8" × 12.8" × 2.5" | 34" × 12" |
| Hotel Pan-Medium | 20.8" × 12.8" × 4" | 34" × 12" |
| Hotel Pan-Deep | 20.8" × 12.8" × 6" | 34" × 18" |
| Electric Roaster (22 Qt) | 18" × 13" × 6.5" | 34" × 16" |

The liners disclosed herein are multi-layer liners made from two or more materials. For example, the liners can be made by dry thermal laminating commercially available food grade aluminum to a polymer (e.g., nylon or polyester), polymer blend, or layered polymer film. The dry thermal lamination technique eliminates the use of adhesives, which may not be suitable for cooking applications. Such specialized dry thermal laminating techniques can be performed, for example, with the equipment of Dunmore Corporation of Bristol, Pa.

In an embodiment, a layered polymer film of biaxially-oriented polyester ("BOPET") coextruded with an amorphous polyester ("APET") sealant layer is used. These films are commercially available from E. I. du. Pont de Nemours and Company ("DuPont") of Wilmington, Del. (e.g., Mylar 850H); Filmquest Group Inc. of Bolingbrook, Ill.; Toray Plastics (America) Inc. of North Kingstown, R.I. (e.g., PA25-120); and others. In an embodiment, Dunmore's specialized dry thermal laminating equipment can be used to produce a full 36" wide roll of 35 gage food grade aluminum foil laminated directly to a 120 gage BOPET film coextruded on one side with an APET sealant layer. The lamination can be accomplished, for example, by passing the foil and polymer film (with the APET layer in contact with the foil) through a heated roller nip set at 280° F. Precise web handling capabilities with the Dunmore equipment can prevent wrinkles due to the very thin foil thickness and the disparate heat expansion coefficients between foil and BOPET. The foil/polymer material can be made into the liners disclosed herein using patented techniques of M&Q Packaging Corporation of Schuylkill Haven, Pa., for example, those disclosed in U.S. Pat. No. 7,163,120, which is incorporated by reference herein in its entirety.

An important aspect of some embodiments is that the liners do not use an adhesive to laminate the foil to the polymer film. Generally, APET has a lower melting point than BOPET, so when thermally laminating, the APET sealant layer adheres to the foil. This provides adherence, without having the negative characteristics of an adhesive, such as releasing carcinogens when heated to cooking temperatures.

The liners provide many others benefits, including that hotspots of cooking vessels do not pose a melting concern as with standard nylon and polyester liners due to the aluminum foil outer layer. The liners can withstand temperatures of 400° F. for up to 6 hours or more. The liners can also withstand hotspot temperatures up to at least 570° F. without melting to the cooking vessel.

The liners are also pliable but with the foil layer sturdy enough to allow the liner to stand up on its own. This allows the consumer to shape the liner to the exact pan shape and dimensions. The inner ovenable polyester (or nylon) cooking film layer eliminates food sticking issues that would be a problem for aluminum foil in direct product contact. Since the aluminum is not in contact with the food, there are also no issues with erosion from food acids or other chemical reactions.

After cooking, the liner can be utilized as a storage container (with no leakage of the contents) by simply wrapping the leftovers up and storing in a refrigerator or freezer and then reheating in the same liner when required. Nylon ties are not necessary as closures because the liners can simply be hand-rolled or crimped closed and used as a bag. Further, the liners are opaque, so no light will penetrate. The liners also provide an excellent odor barrier.

Examples of various embodiments of liner 100 are presented below. A person skilled in the relevant art will understand that the examples set forth herein are representative and that other materials having suitable properties can be used to form liner 100 in accordance with the teachings set forth herein. These examples are not exhaustive and are not meant to be limiting of the breadth and scope of the present invention. Rather, these examples are meant to illustrate the structure, function, features, and operation of the invention. Each of these example embodiments may be manufactured from a variety of materials in a variety of sizes.

As described herein the various embodiments of the liner are formed from sheet materials with edges being formed by either folding a single sheet or sealing together two sheets or two edges of a sheet. The term "seal" as used herein therefore means an edge that is formed either by folding a single sheet or sealing together two sheets or two edges of a sheet. A person skilled in the relevant art will understand that whether an edge is formed by folding or sealing will often be a design choice influenced by manufacturing processes, available material configurations, or application requirements. For example, sheet materials formed in a tube configuration can be manufactured into liners by cutting a desired length from the tube stock and then sealing only an end of the cut portion. In contrast, a liner manufactured from two rectangular sheets of material would require sealing to be applied to three sides of the rectangle to form a liner. And a liner manufactured from a single rectangular sheet of material, could be folded in half and sealed on each side adjacent the fold to form a liner.

Figure 2:
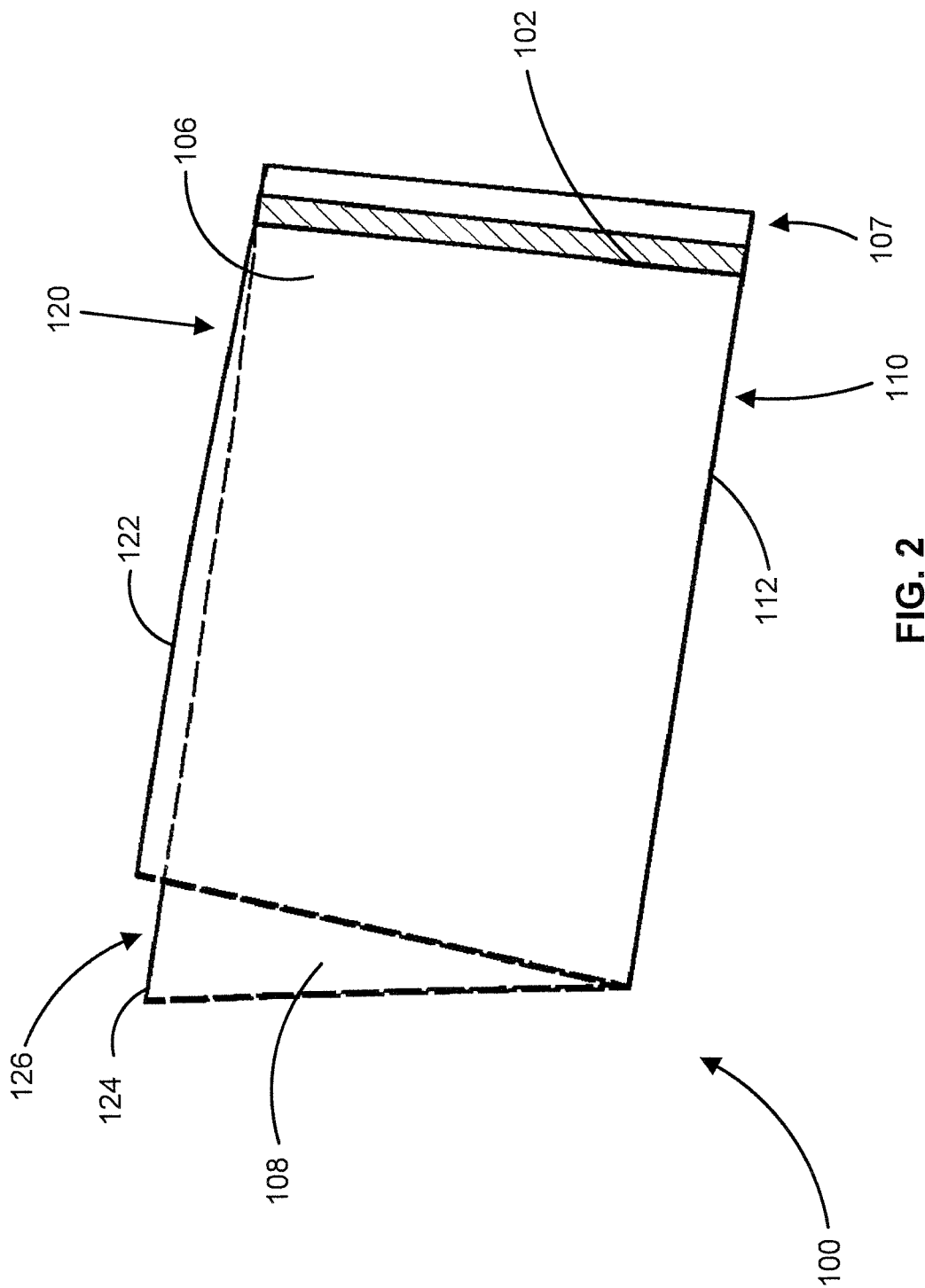
FIG. 2 illustrates a section view of the liner of FIG. 1, according to an embodiment disclosed herein.

FIG. 1 illustrates liner 100, according to a first embodiment. FIG. 2 illustrates a section view of liner 100, according to the first embodiment. In certain embodiments, liner 100 can be formed from a single sheet of multi-layer liner material. For example, a sheet of material can be folded in half and sealed along two opposite sides to form a closed bottom end, top opening, and two sealed sides. Any of the seals disclosed herein can be formed by heat or thermo-sealing, impulse-sealing, sonic-sealing, RF-sealing, or any other type of sealing. Other suitable techniques can be used to seal liner 100, such as bonding, stitching, adhesion, etc.

Liner 100 can include bottom end 110 having bottom edge 112. In certain embodiments, liner 100 can include first side seal 102 and second side seal 104. Forming liner 100 in this manner can create top end 120, having first top edge 122, second top edge 124, and top opening 126. First lateral wall 106 can be bounded by first side seal 102, second side seal 104, bottom edge 112, and first top edge 122. Second lateral wall 108 can be bounded by first side seal 102, second side seal 104, bottom edge 112, and second top edge 124.

Figure 3:
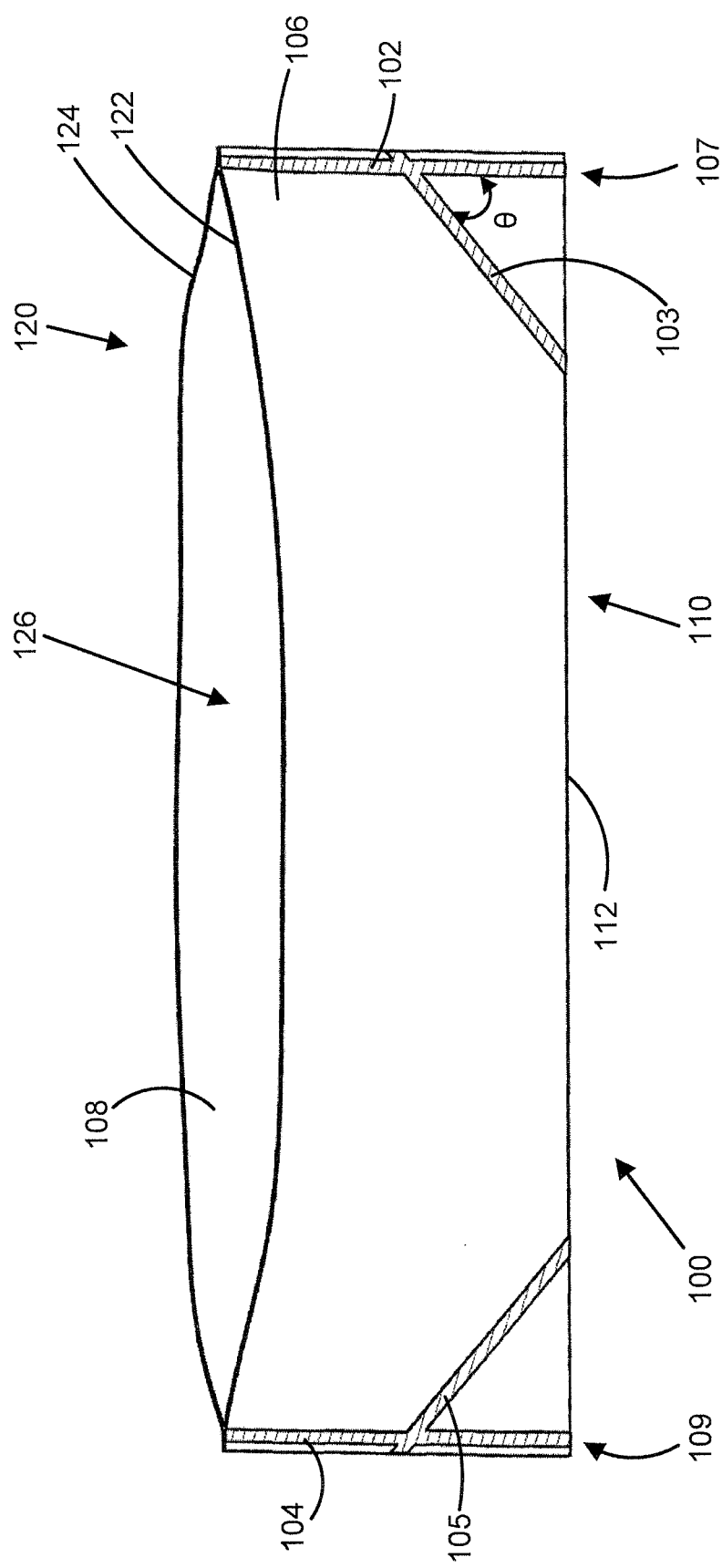
FIG. 3 illustrates the liner of FIG. 1 with angled side seals, according to an embodiment disclosed herein.
Figure 4:
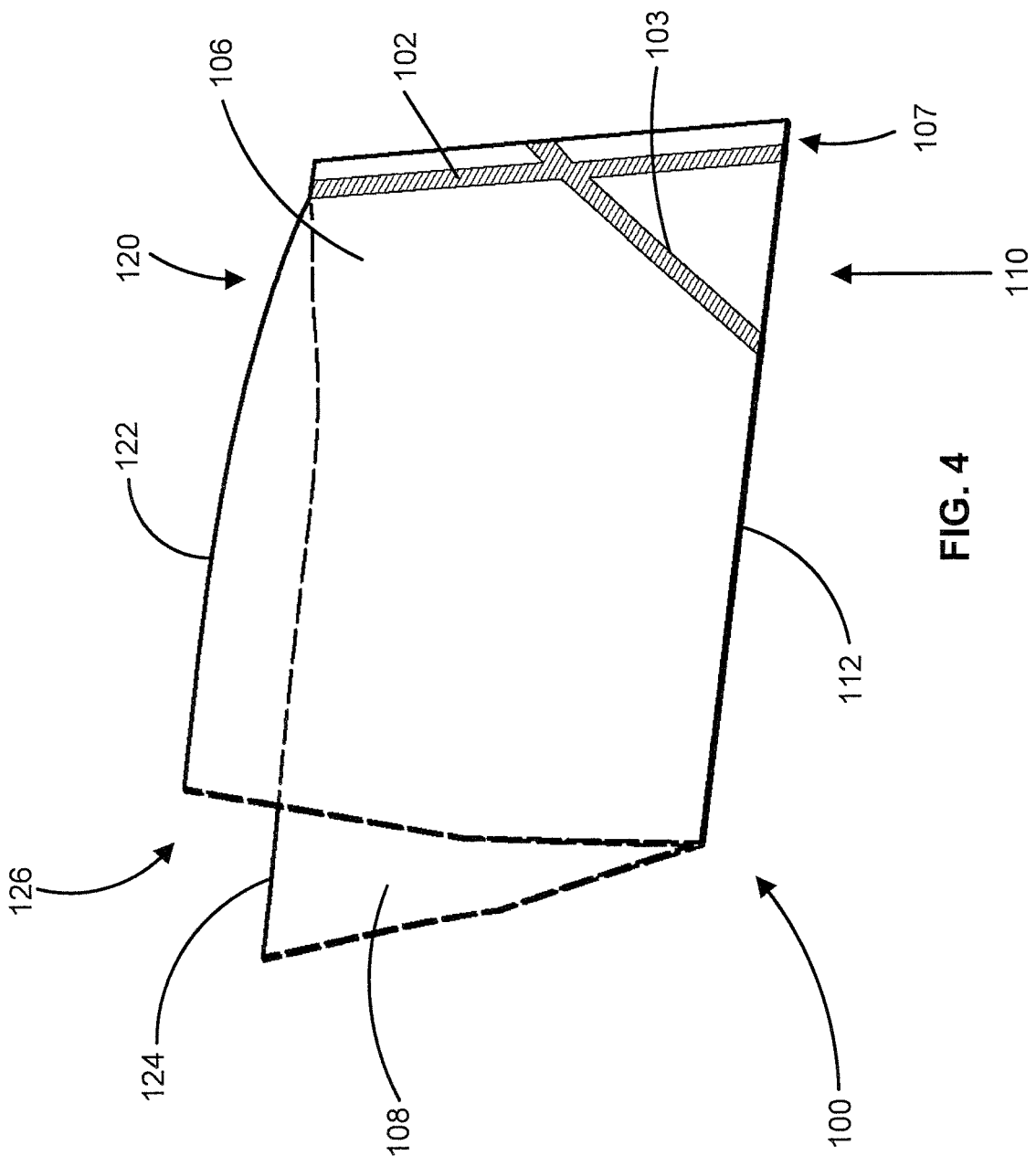
FIG. 4 illustrates a section view of the liner of FIG. 3, according to an embodiment disclosed herein.

FIG. 3 illustrates liner 100, according to a second embodiment. FIG. 4 illustrates a section view of liner 100, according to the second embodiment. In addition to the features described above with respect to the first embodiment shown in FIGS. 1 and 2, the second embodiment can include first angled seal 103 and second angled seal 105. First angled seal 103 and second angled seal 105 can be formed by any of the sealing methods disclosed herein. First angled seal 103 and second angled seal 105 can create a more form-fitting shape for liner 100 when placed in pan 200, in comparison to the first embodiment. Contour fit pan liners are described in commonly owned U.S. Pat. No. 7,163,120, which is incorporated herein by reference as if reproduced in full below.

In certain embodiments, first angled seal 103 can extend from first side seal 102 to bottom edge 112. Similarly, second angled seal 105 can extend from second side seal 104 to bottom edge 112. First angled seal 103 and second angled seal 105 can seal first lateral wall 106 and second lateral wall 108 together along the respective seal. First angled seal 103 can begin anywhere along first end 107 and terminate anywhere along bottom edge 112. Second angled seal 105 can begin anywhere along second end 109 and terminate anywhere along bottom edge 112. In certain embodiments, first angled seal 103 and second angled seal 105 can be closer to bottom end 110 than top end 120. In certain embodiments, first angled seal 103 and/or second angled seal 105 can begin at first side seal 102 and second side seal 104, respectively. An angle "θ" (shown in FIG. 3) formed between the respect side seals and angled seals can vary. In certain embodiments, the angle θ can be in the range of about 20 degrees to about 70 degrees. In certain embodiments, the angle θ can be about 45 degrees.

Figure 17:
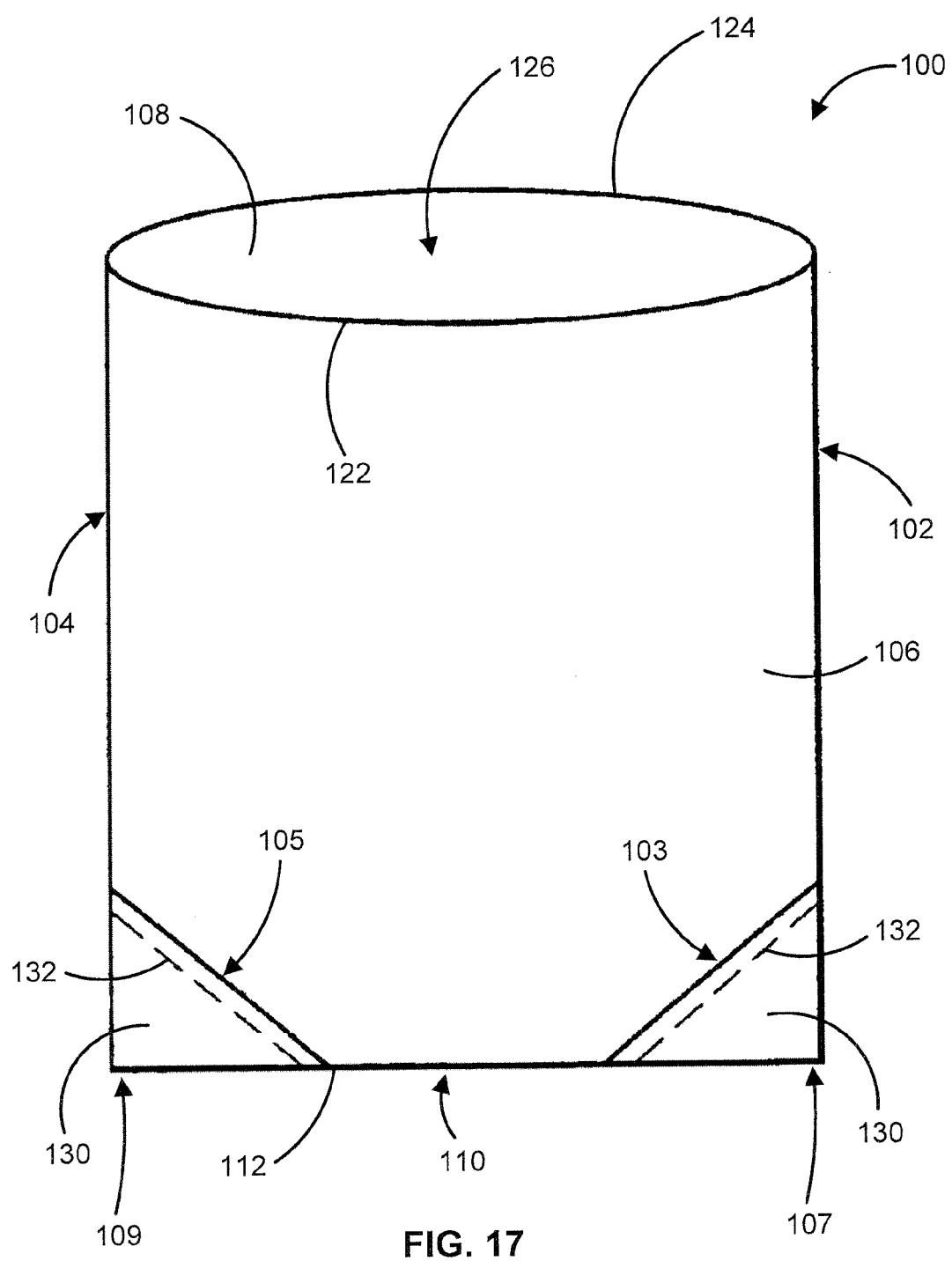
FIG. 17 illustrates a liner with angled side seals and perforations, according to an embodiment disclosed herein.

In certain embodiments, for example, as shown in FIG. 17, first angled seal 103 and second angled seal 105 can seal off "dog ear" portions 130 of liner 100. This can prevent the contents of liner 100 from entering and becoming trapped in the bottom corners (i.e., in dog ear portions 130) of liner 100. Dog ear portions 130 can be left on or removed. When removed, the fit of liner 100 within the cooking vessel can be improved, with liner 100 following contours of the cooking vessel without interference from dog ear portions 130. In certain embodiments, dog ear portions 130 can be removed during manufacturing, for example, by cutting. In certain embodiments, dog ear portions 130 can be removed just prior to use. For example, a liner 100 can include perforations 132 through dog ear portions 130 near first angled seal 103 and second angled seal 105. Dog ear portions 130 can be removed by tearing along perforations 132.

Figure 8:
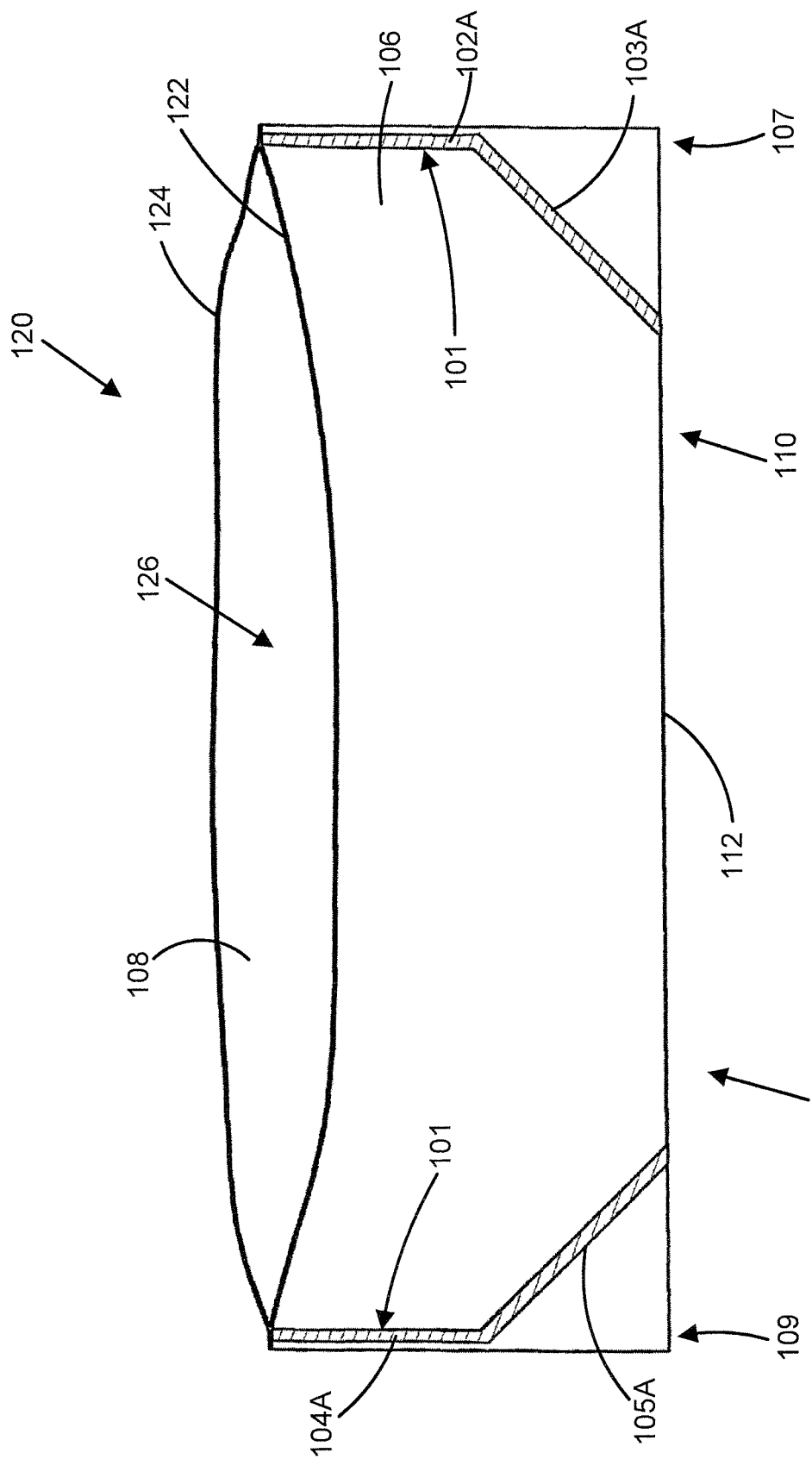
FIG. 8 illustrates the liner of FIG. 3 with continuous side seals, according to an embodiment disclosed herein.

In certain embodiments, for example, as shown in FIG. 8, the side seals and angled seals can be formed as a single, continuous seal. For example, a first continuous seal 101 along first end 107 can have a side seal portion 102A and an angled seal portion 103A. Similarly, a second continuous seal 101 along second end 109 can have a side seal portion 104A and an angled seal portion 105A. Any of the embodiments disclosed herein can use a continuous seal rather than a separate side seal and angled seal.

In certain embodiments, side seal portions 102A and 104A can be parallel to first end 107 and second end 109, respectively. In certain embodiments, side seal portions 102A and 104A can extend along more than half the distance between top end 120 and bottom end 110. Side seal portions 102A and 104A can be the same length or different lengths.

Generally, angled seal portions 103A and 105A are formed at an angle with respect to side seal portions 102A and 104A, respectively, as described above. Angles and lengths of side seal portions 102-105 can vary. In certain embodiments, the side seals can be curved or radiused to provide a smooth transition between the side edges and bottom edge of the liner.

Figure 5:
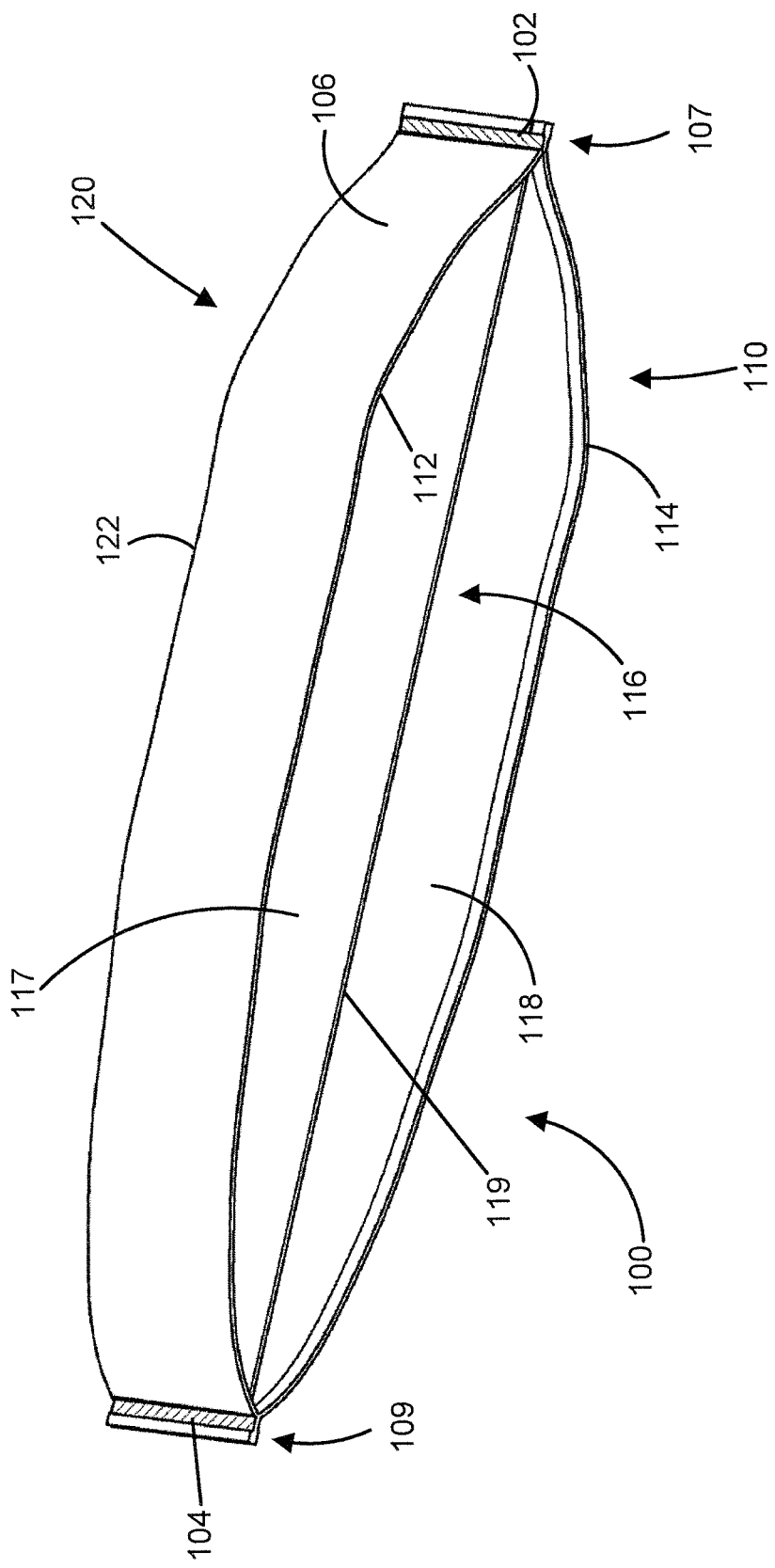
FIG. 5 illustrates a liner, according to another embodiment disclosed herein.
Figure 6:
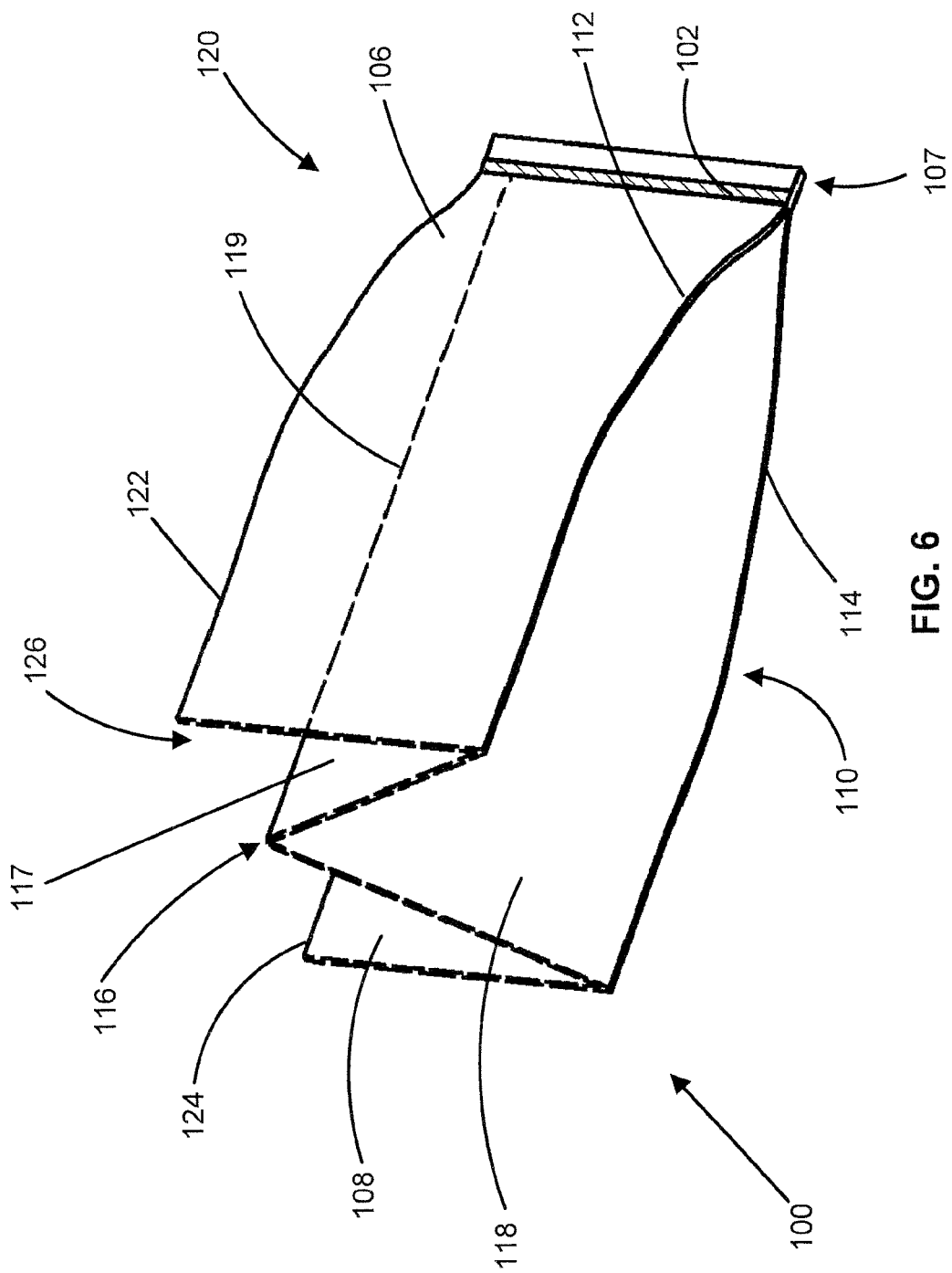
FIG. 6 illustrates a section view of the liner of FIG. 5, according to an embodiment disclosed herein.

FIG. 5 illustrates liner 100, according to a third embodiment. FIG. 6 illustrates a section view of liner 100, according to the third embodiment. In this embodiment, liner 100 includes bottom end 110, first side seal 102, second side seal 104, and top end 120. And bottom end 110 includes bottom edge 112 and a second bottom edge 114. Top end 120 includes first top edge 122, second top edge 124, and top opening 126.

In this third embodiment, liner 100 includes gusset 116. Gusset 116 can allow for bottom end 110 of liner 100 to expand along bottom panel 202 of pan 200 for a more contoured fit. Gusset 116 can extend between bottom edge 112 and second bottom edge 114. In certain embodiments, gusset 116 can have fold line 119. In certain embodiments, fold line 119 can be located approximately half-way between bottom edge 112 and second bottom edge 114. Gusset 116 can include first bottom panel 117 and second bottom panel 118. First bottom panel 117 can be bounded by bottom edge 112 and fold line 119. Second bottom panel 118 can be bounded by second bottom edge 114 and fold line 119. For example, gusset 116 can have a W-shape, where each portion is the same length or different lengths.

As shown, for example, in FIG. 6, in certain embodiments, gusset 116 can form a V-shape between first lateral wall 106 and second lateral wall 108. In certain embodiments, first bottom panel 117 can be approximately equal in size to first lateral wall 106. Second bottom panel 118 can be approximately equal in size to second lateral wall 108. First bottom panel 117 and second bottom panel 118 can also be larger or smaller in size than first lateral wall 106 and second lateral wall 108, respectively.

Figure 7:
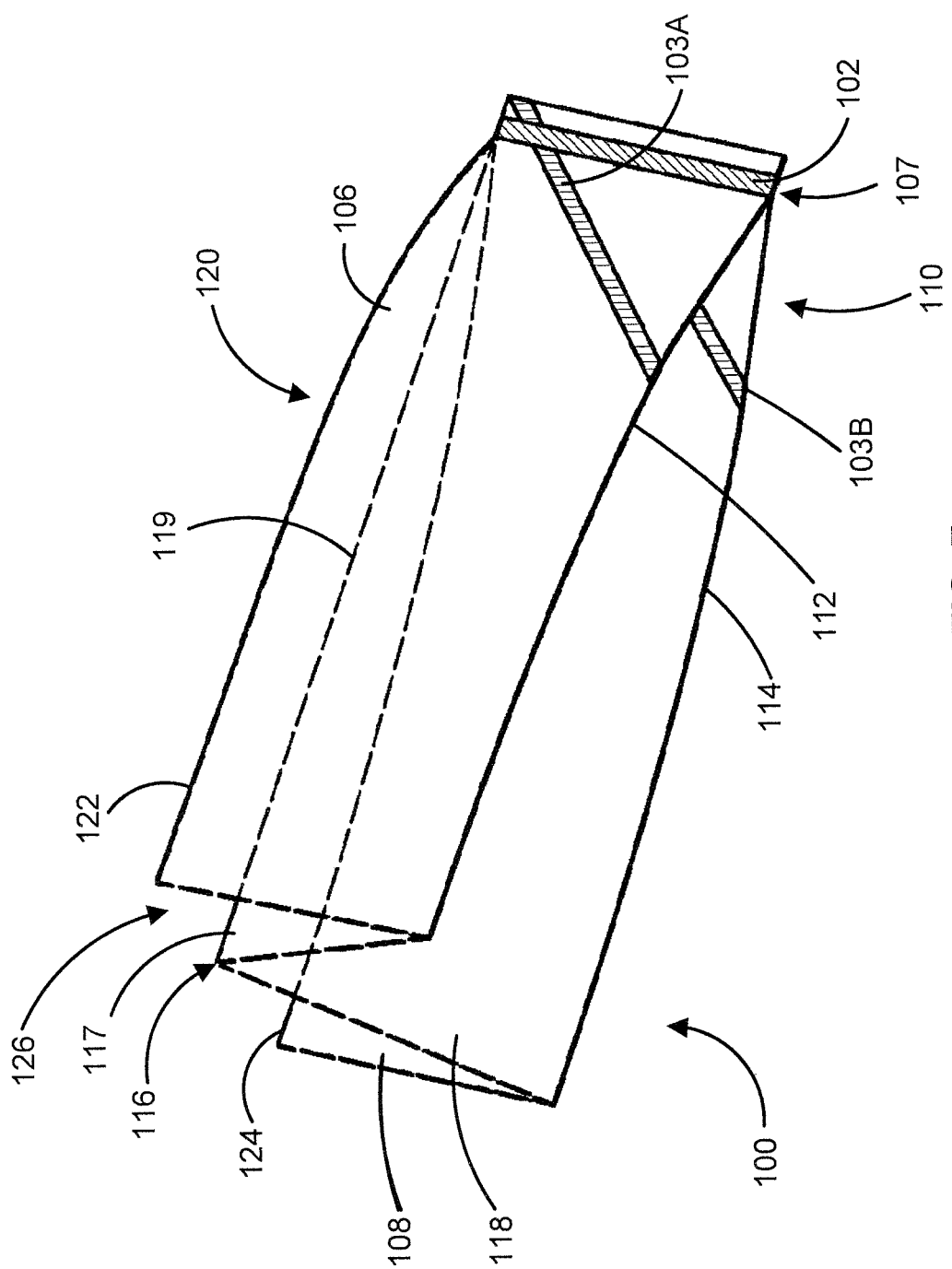
FIG. 7 illustrates a section view of the liner of FIG. 5 with angled side seals, according to an embodiment disclosed herein.

FIG. 7 illustrates a section view of liner 100, according to a fourth embodiment. As shown in FIG. 7, in addition to the features of the third embodiment, described above, the fourth embodiment can include angled seals 103A and 103B. Angled seals 105A and 105B (not shown) can be located at an opposite end of liner 100. Angled seal 103A can seal first lateral wall 106 to first bottom panel 117 of gusset 116 from first side seal 102 to bottom edge 112. Angled seal 105A can seal first lateral wall 106 and first bottom panel 117 from second side seal 104 to bottom edge 112. Similarly, angled seals 103B and 105B can seal second lateral wall 108 and second bottom panel 118.

Figure 9:
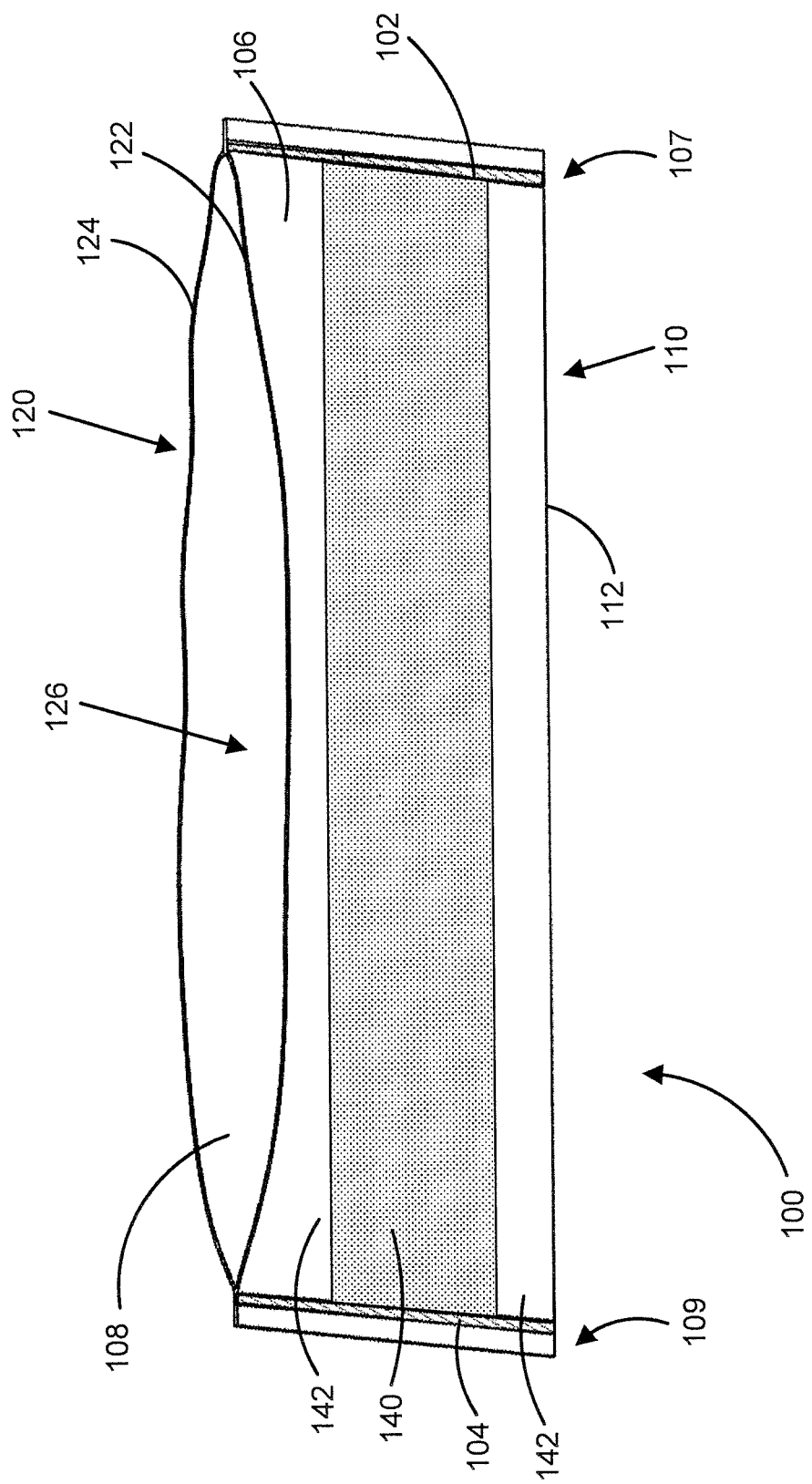
FIG. 9 illustrates a liner having only a medial (or partial) aluminum foil band, according to an embodiment disclosed herein.

FIG. 9 illustrates a liner 100, according to a fifth embodiment. The embodiment in FIG. 9 can include any of the other features described herein with respect to other embodiments. As shown in FIG. 9, liner 100 can include a foil band 140. The remainder of liner 100 can be a polymer film as described herein. Foil band 140 can be disposed anywhere between top end 120 and bottom end 110 of liner 100. Foil band 140 can be disposed along first lateral wall 106 and/or second lateral wall 108. In certain embodiments, foil band 140 is disposed such that there is a polymer band 142 between foil band 140 and bottom edge 112 and also a polymer band 142 between foil band 140 and first and second top edges 122, 124. Disposing foil band 140 around liner 100 in this manner can protect against the hottest portions of a cooking vessel, for example, the side walls of an electric roaster, where the temperature may spike above the temperature setting. In certain embodiments, a portion of foil band 140 can coincide with bottom edge 112 or with first and second top edges 122, 124. Advantages of this embodiment include faster cooking, because heat can more easily penetrate the portions of the liner walls (and bottom) that include only polymer material. In addition, the resulting liner may be less expensive to manufacture due to lower aluminum content. And the liner will be more flexible and conforming to the shape of a pan or pot due to less use of aluminum, yet the aluminum band will still function to maintain the side shape of the liner.

Figure 10:
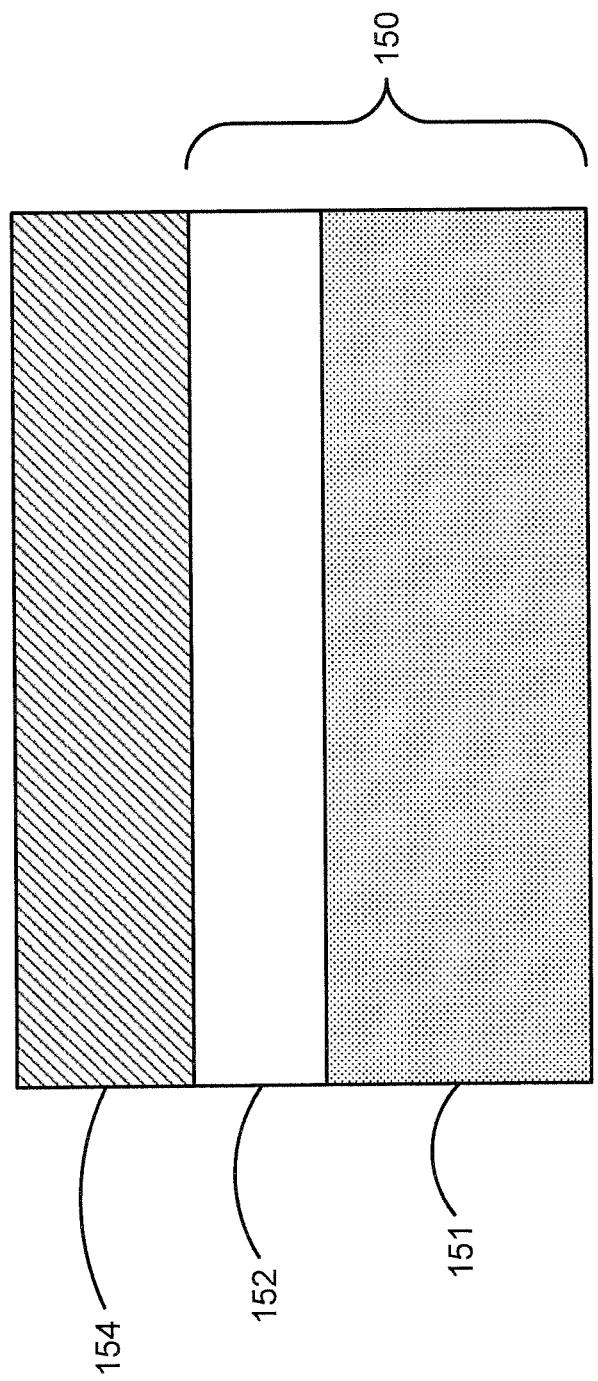
FIG. 10 illustrates a cross-section view of the layers of a liner, according to an embodiment disclosed herein.

FIG. 10 illustrates a cross-section view of the multiple layers of a liner 100, according to an embodiment. In certain embodiments, polymer layer 150 is the interior layer and foil layer 154 is the exterior layer. Polymer layer 150 can comprise multiple layers of polymers. For example, polymer layer 150 can have a base layer 151 (e.g., nylon or polyester) and a sealant layer 152. In certain embodiments, base layer 151 can be coextruded with sealant layer 152. In certain embodiments, base layer 151 can be biaxially-oriented polyethylene terephthalate layer and sealant layer 152 can be amorphous polyethylene terephthalate. Foil layer 154 can be thermally laminated to polymer layer 150. The APET layer can act as an adhesive between the BOPET layer and the foil layer.

The thicknesses of the entire liner and each layer can vary. Preferably, the total thickness of the liner can be in the range of about 0.7 mils to 2.2 mils. More preferably, the total thickness of the liner can be in the range of about 1.1 mils to about 1.8 mils. Preferably, the aluminum foil layer can have a thickness in the range of about 0.2 mils to about 0.7 mils. More preferably, the aluminum foil layer can have a thickness in the range of about 0.3 mils to about 0.5 mils. In certain embodiments, the aluminum foil layer can have a thickness of about 0.35 mils. Preferably, the polymer film (i.e., the BOPET and APET sealant layer) can have a thickness in the range of about 0.5 mils to about 1.5 mils. More preferably, the polymer film can have a thickness in the range of about 0.8 mils to about 1.3 mils. In certain embodiments, the polymer film can have a thickness of about 1.2 mils. In one example embodiment, the aluminum foil layer has a thickness of about 0.35 mils and the polymer film has a thickness of about 1.2 mils. The thickness of the BOPET layer and APET sealant layer of the polymer film can also vary. In certain embodiments, the BOPET layer is thicker than the APET layer.

FIGS. 11 through 16 show examples of cooking systems using liners according to embodiments described herein. As shown in FIGS. 11 through 16, each cooking system 300 includes a pan 200 and a liner 100. Liner 100 is removably disposed inside pan 200 such that liner 100 covers an interior surface of pan 200. Liner 100 is configured to hold food (not shown) that can be disposed within pan 200. Features of liner 100 disclosed herein, for example angled seals 103 and 105, provide liner 100 with a contoured or shaped bottom end 110, for an improved or custom fit of liner 100 to the cooking vessel (e.g., pan 200). This minimizes problems associated with conventional pan liners which do not properly fit within the pan and which have dog ears formed at the right angle corners of the liner bottom. Other shapes and sizes of liner 100 are contemplated, including but not limited to square, rectangular, triangular, cone-shaped, and cylindrical.

FIG. 11 illustrates cooking system 300, according to an embodiment. As shown in FIG. 11, cooking system 300 can include liner 100 and pan 200. Any other cooking vessel (e.g., an electric roaster, slow-cooker, crock pot, etc.) can be substituted for pan 200. Pan 200 can be made from any material that is suitable for high temperature food applications, for example, ceramics, stainless steel, glass, plastics, etc.

Pan 200 can include bottom panel 202 and side walls 204a, 204b, 204c, and 204d, which can extend upwardly from bottom panel 202. Each side wall 204a-d can terminate in a respective top edge 206a, 206b, 206c, and 206d. Top edges 206a-d can form pan opening 208. Alternatively, pan 200 can have a continuous wall and top edge, for example, if pan 200 is oval-shaped or circular. In certain embodiments, a flange 210 can extend from top edges 206a-d (see FIG. 13). Flange 210 can facilitate securing liner 100 about pan 200 by curling liner 100 under flange 210. It is understood that pan 200 can be many other shapes and sizes.

Figure 13:
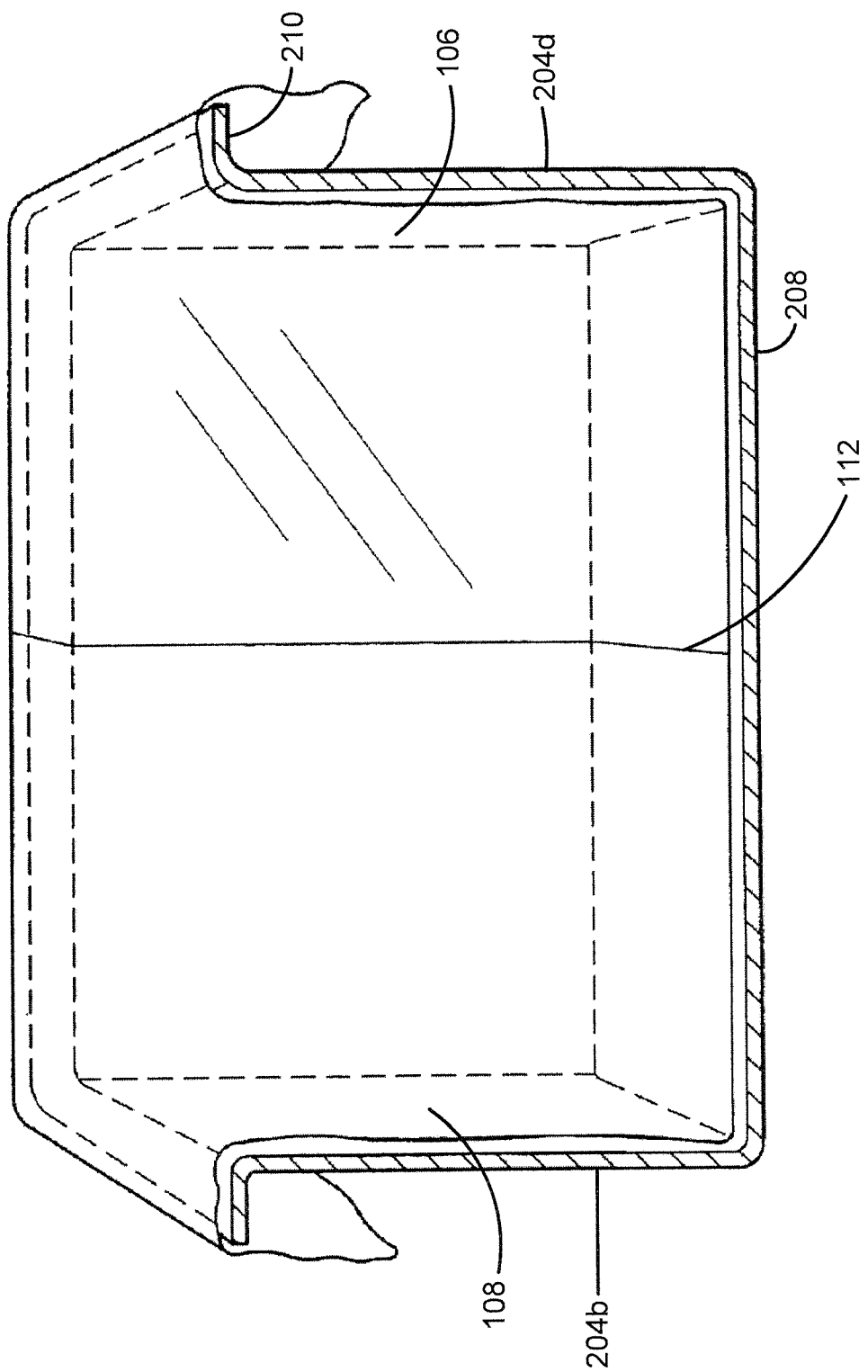
FIG. 13 illustrates cross-section view of the cooking system of FIG. 12, according to an embodiment disclosed herein.

FIG. 12 illustrates cooking system 300 with liner 100 placed inside pan 200. In certain embodiments, liner 100 can be sized in relation to pan 200 such that top edges 122 and 124 of top opening 126 can be folded outwardly over top edges 206a-d of pan 200. First and second lateral walls 106 and 108 of liner 100 can contact bottom panel 202 and side walls 204a-d of pan 200. The cross-section view of FIG. 13 illustrates the contour fit of liner 100 within pan 200, according to an embodiment. Top edges 122 and 124 need not be folded outwardly over top edges 206a-d of pan 200 (or a flange 210 extending therefrom). Rather, in certain embodiments, top edges 122 and 124 remain within pan 200, contacting side walls 204a-d of pan 200.

Figure 14:
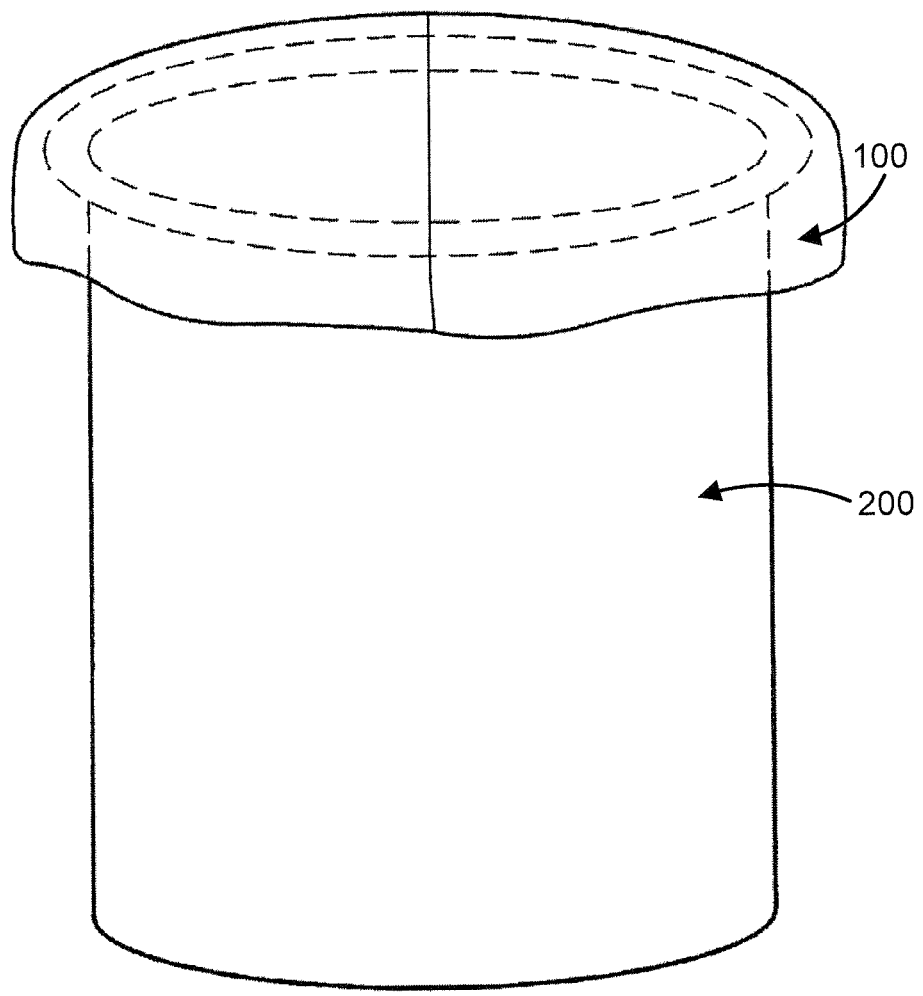
FIG. 14 illustrates a cooking system, according to an embodiment disclosed herein.
Figure 15:
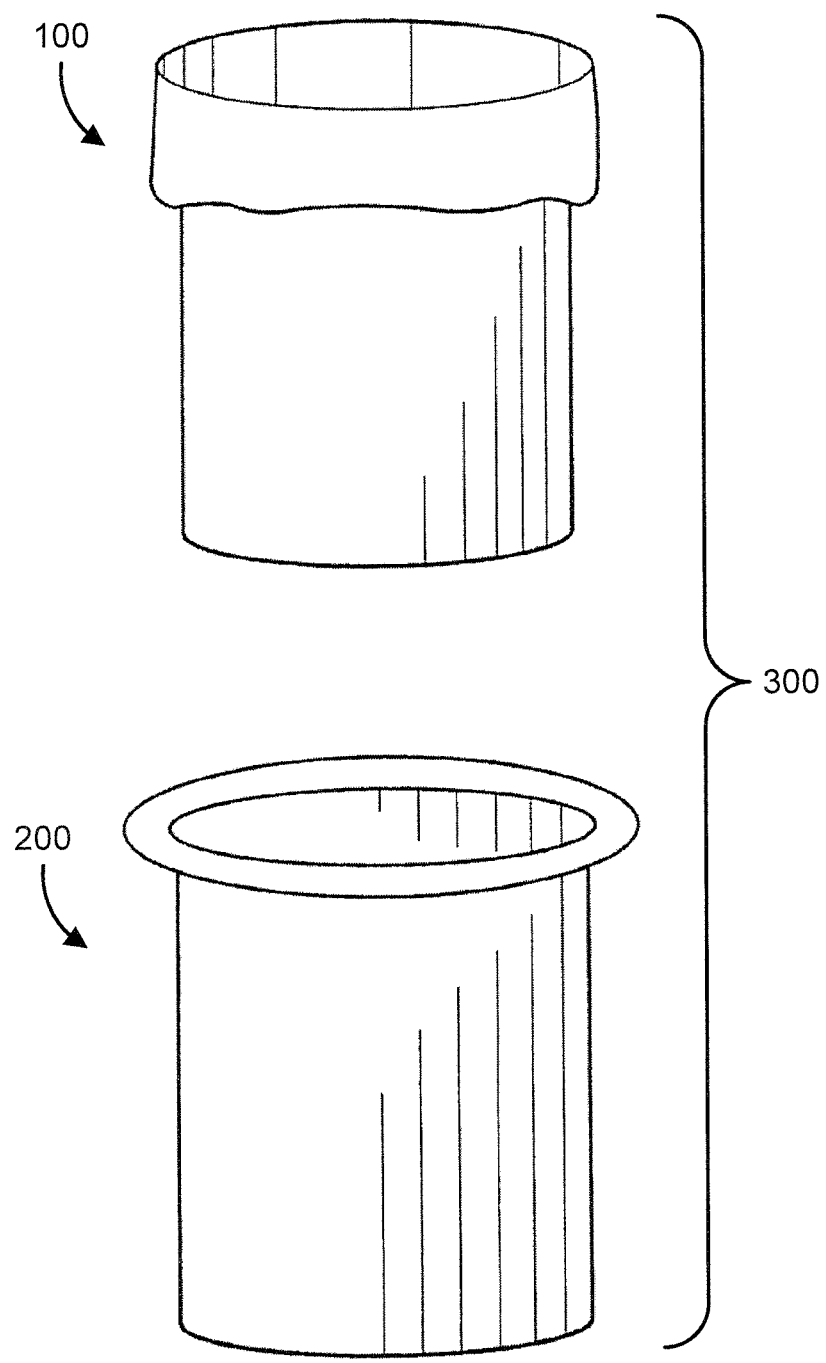
FIG. 15 illustrates a liner and a cooking vessel of a cooking system, according to an embodiment disclosed herein.
Figure 16:
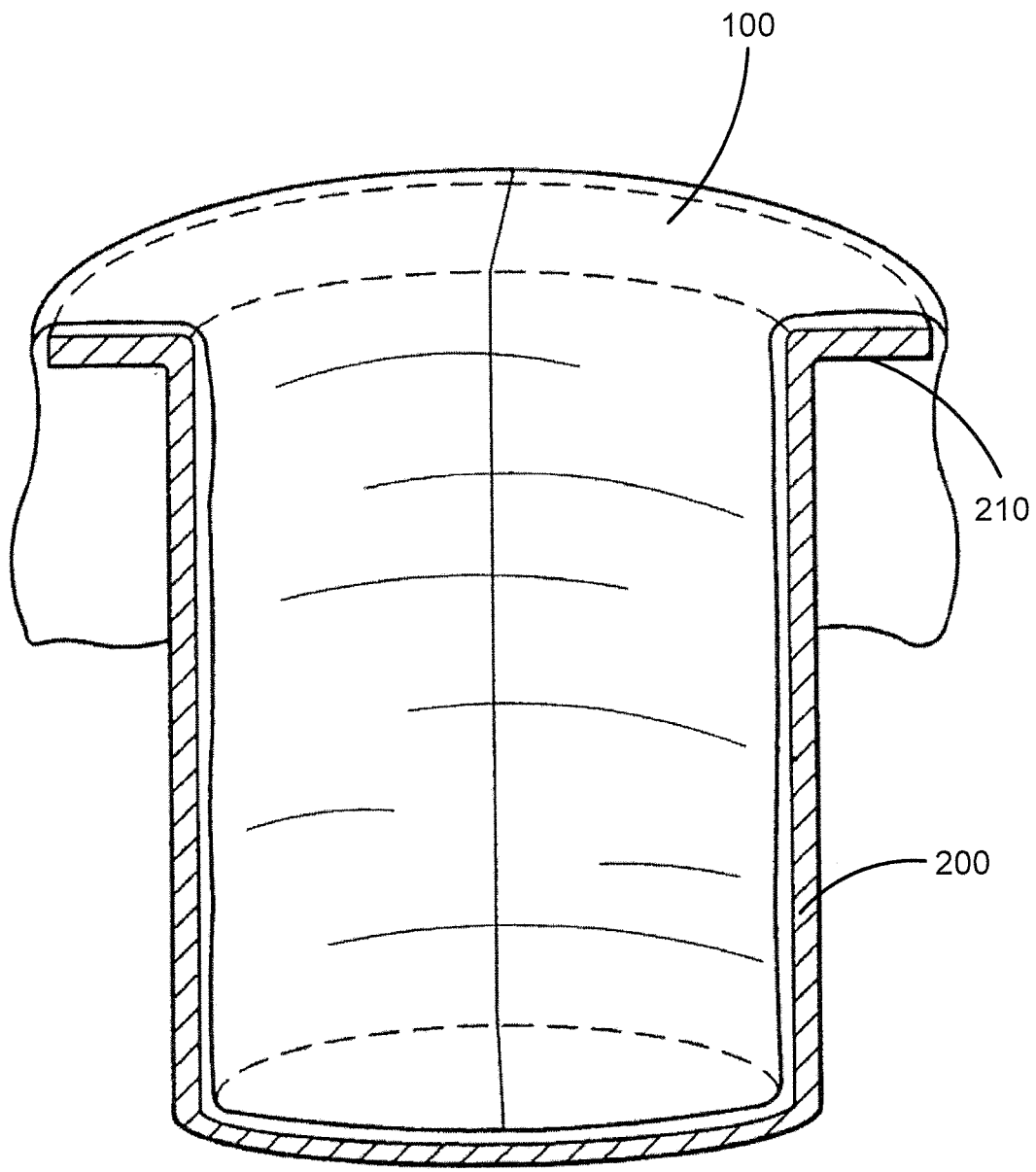
FIG. 16 illustrates cross-section view of the cooking system of FIG. 14, according to an embodiment disclosed herein.

FIGS. 14-16 illustrate another embodiment of cooking system 300, where liner 100 and pan 200 are cylindrical. FIG. 14 illustrates liner 100 placed inside pan 200. FIG. 15 illustrates liner 100 and pan 200 separately. And FIG. 16 illustrates a cross-section view showing the contour fit of liner 100 within pan 200. In any system, after use, liner 100, and any remaining food, can be removed from pan 200, and liner 100 can be used to store the remaining food for future use.

Methods of making liners for cooking vessels are also contemplated and disclosed herein. In certain embodiments, the liner material can be formed by dry thermal laminating an aluminum foil sheet to a polymer film. In certain embodiments, the polymer film can comprise a biaxially-oriented polyethylene terephthalate ("BOPET") layer coextruded with an amorphous polyethylene terephthalate ("APET") sealant layer. The APET layer of the polymer film can be disposed adjacent to the aluminum sheet. In certain embodiments, lamination can be accomplished by passing the foil and polymer film (with the APET layer side in contact with the foil) through a heated roller nip set at 280° F. In certain embodiments, the temperature of the heated roller nip can be greater than 280° F. The speed at which the foil and polymer film pass through the roller nip can be adjusted to avoid wrinkling.

The method can further include folding a piece of the liner material substantially in half such that the aluminum foil faces outward. This can form a bottom edge, first and second free edges opposite the bottom edge, and first and second ends. In certain embodiments, the first and second ends can be substantially perpendicular to the bottom edge and the free edges. The method can further include sealing the first and second ends between the free edges and bottom edge, forming an opening and an interior of the cooking liner. In certain embodiments, multiple seals can be made, for example, a side seal and an angled seal. In certain embodiments, sealing the first and second ends comprises forming two continuous seals, each having a longitudinal portion and an angled portion. In certain embodiments, a curved seal can be formed. In other embodiments, as explained above, any seal can be made by either folding or sealing (e.g., by thermal bonding). And, as used herein the term "seal" means formation of an edge either by folding or sealing together two sheets or two edges of a sheet. Sealing is accomplished by known means including thermal sealing, radio frequency (RF) welding, thermal welding, or the like, as would be apparent to a person skilled in the relevant art.

The method can also include removing a dog ear portion of the liner formed by one or more seal. For example, the dog ear portion can be cut off. In certain embodiments, the method can include perforating the dog ear portion near a seal such that the dog ear portion can be removed by tearing along the perforation.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:

1. A multi-layer liner for a cooking vessel, comprising:
   a closed bottom having a bottom edge;
   a top opening comprising a first top edge and a second top edge;
   a first side seal extending along a first end from the top opening toward the bottom edge;
   a second side seal extending along a second end from the top opening toward the bottom edge;
   a first lateral wall formed by the first top edge, bottom edge, first side seal, and second side seal; and
   a second lateral wall formed by the second top edge, bottom edge, first side seal, and second side seal,
   wherein the liner material comprises:
   an aluminum foil sheet configured to contact the cooking vessel; and
   a polymer film comprising a biaxially-oriented polyethylene terephthalate layer coextruded with an amorphous polyethylene terephthalate sealant layer,
   wherein the aluminum foil sheet is thermally laminated to the polymer film.

2. The multi-layer liner of claim 1, wherein the amorphous polyethylene terephthalate sealant layer is disposed between the biaxially-oriented polyethylene terephthalate layer and the aluminum foil sheet.

3. The multi-layer liner of claim 1, wherein the amorphous polyethylene terephthalate sealant layer has a lower melting point than the biaxially-oriented polyethylene terephthalate layer.

4. The multi-layer liner of claim 1, wherein the polymer film is disposed as an interior surface of the liner.

5. The multi-layer liner of claim 1, wherein the first and second side seals are substantially parallel with the first and second ends, respectively.

6. The multi-layer liner of claim 1, further comprising:
a first angled seal extending from the first side seal toward the bottom edge; and a second angled seal extending from the second side seal toward the bottom edge.

7. The multi-layer liner of claim 6, wherein the first side seal and first angled seal form a first continuous seal, and wherein the second side seal and second angled seal form a second continuous seal.

8. The multi-layer liner of claim 6, wherein the first angled seal is disposed at an angle greater than 20 degrees with respect to the first side seal, and wherein the second angled seal is disposed at an angle greater than 20 degrees with respect to the second side seal.

9. The multi-layer liner of claim 6, wherein the first and second angled seals form dog ear portions of the liner.

10. The multi-layer liner of claim 9, wherein the dog ear portions are removable.

11. The multi-layer liner of claim 1, wherein the polymer film and aluminum foil sheet are thermally laminated at a temperature of about 280 degrees Fahrenheit.

12. The multi-layer liner of claim 1, wherein the polymer film and aluminum foil sheet are thermally laminated at a temperature greater than 280 degrees Fahrenheit.

13. The multi-layer liner of claim 1, wherein the aluminum foil sheet is thermally laminated to the polymer film without using an adhesive.

14. The multi-layer liner of claim 1, wherein the liner is capable of withstanding a temperature of at least about 400 degrees Fahrenheit for at least about two hours.

15. The multi-layer liner of claim 1, wherein the aluminum foil sheet has a thickness in the range of about 0.2 mils to about 0.7 mils.

16. The multi-layer liner of claim 1, wherein the aluminum foil sheet has a thickness of about 0.35 mils.

17. The multi-layer liner of claim 15, wherein the polymer film has a thickness in the range of about 0.5 mils to about 1.5 mils.

18. The multi-layer liner of claim 16, wherein the polymer film has a thickness of about 1.2 mils.

19. The multi-layer liner of claim 1, wherein the cooking vessel is an electric roaster, and wherein a width of the liner is about 34 inches and a length of the liner is about 16 inches.

20. The multi-layer liner of claim 1, wherein the aluminum foil extends only along a portion of the first and second lateral walls.

21. The multi-layer liner of claim 1, wherein the closed bottom comprises two bottom edges, and wherein a gusset is formed between the two bottom edges.

22. A system for cooking food, comprising:
a cooking vessel; and
a liner sized to fit about an interior surface of the cooking vessel, the liner comprising:
an aluminum foil sheet thermally laminated to a polymer film, wherein the aluminum foil sheet is configured to contact the cooking vessel; and
a first side seal extending along a first end of the liner and a second side seal extending along a second end of the liner, forming a closed bottom and a top opening of the liner,
wherein the liner is capable of withstanding a temperature of at least about 400 degrees Fahrenheit for at least about two hours, and
wherein the polymer film comprises a biaxially-oriented polyethylene terephthalate layer coextruded with an amorphous polyethylene terephthalate sealant layer.

23. The system for cooking food of claim 22, wherein the cooking vessel is an electric roaster, a baking dish, or a Gastronorm pan.

24. A multi-layer liner for a cooking vessel, comprising:
a closed bottom having a bottom edge;
a top opening comprising a first top edge and a second top edge;
a first side seal extending along a first end from the top opening toward the bottom edge;
a second side seal extending along a second end from the top opening toward the bottom edge;
a first lateral wall formed by the first top edge, bottom edge, first side seal, and second side seal; and
a second lateral wall formed by the second top edge, bottom edge, first side seal, and second side seal,
wherein the liner is formed from a polymer film comprising a biaxially-oriented polyethylene terephthalate layer coextruded with an amorphous polyethylene terephthalate sealant layer, and an aluminum foil sheet thermally bonded to the polymer film only at a portion of the first and second lateral walls to form a band around the liner between the bottom edge and the top opening.

* * * * *